(12) United States Patent
Dwyer et al.

(10) Patent No.: US 6,438,469 B1
(45) Date of Patent: Aug. 20, 2002

(54) FLIGHT CONTROL SYSTEM AND METHOD FOR AN AIRCRAFT CIRCLE-TO-LAND MANEUVER

(75) Inventors: David Brandt Dwyer, Scottsdale, AZ (US); Dave Charles Maahs, Burnsville, MN (US)

(73) Assignee: Honeywell International Inc., Morristown, NJ (US)

( * ) Notice: Subject to any disclaimer, the term of this patent is extended or adjusted under 35 U.S.C. 154(b) by 0 days.

(21) Appl. No.: 09/498,676

(22) Filed: Feb. 7, 2000

(51) Int. Cl.$^7$ ................................................ C08G 5/04
(52) U.S. Cl. .......................... 701/16; 701/17; 701/18; 340/947; 340/948; 340/945
(58) Field of Search ............................. 701/16, 17, 18; 340/947, 948, 951, 945, 952, 972, 980, 981; 342/33, 34; 244/3.1, 3.23, 75 R, 183, 114 R

(56) References Cited

U.S. PATENT DOCUMENTS

| | | | |
|---|---|---|---|
| 3,786,505 A | 1/1974 | Rennie | 342/33 |
| 4,093,938 A | 6/1978 | Argentieri | 340/970 |
| 4,314,341 A | * 2/1982 | Kivela | 701/16 |
| 4,482,961 A | * 11/1984 | Kilner et al. | 701/16 |
| 5,142,478 A | 8/1992 | Crook | 701/16 |
| 5,260,702 A | 11/1993 | Thompson | 340/970 |
| 5,714,948 A | * 2/1998 | Farmakis et al. | 340/961 |

* cited by examiner

Primary Examiner—William A. Cuchlinski, Jr.
Assistant Examiner—Marthe Y. Marc-Coleman

(57) ABSTRACT

A flight control system and method for controlling a circle-to-land ("CTL") maneuver utilizes an airborne area navigator. The area navigator receives inputs on aircraft category, aircraft position and speed, airport navigation data and pilot supplied data. In response to this data, the area navigator calculates the necessary conditions for executing the CTL maneuver and outputs control commands to a flight director. The pilot then executes the CTL maneuver either manually using the information provided by the area navigator or by using the aircraft autopilot under the direction of the flight director.

26 Claims, 3 Drawing Sheets

FLIGHT CONTROL SYSTEM AND METHOD FOR AN AIRCRAFT CIRCLE-TO-LAND MANEUVER

BACKGROUND OF THE INVENTION

This invention relates generally to a system and method for executing an aircraft circle-to-land maneuver, and more specifically to a system and method for executing a circle-to-land maneuver using the airborne area navigator.

A circle-to-land ("CTL") maneuver is one of the most challenging maneuvers required of flight crews. The CTL maneuver is used when an aircraft approaches an airport on an approach path that does not align with the favored runway. For large commercial airliners, and especially for such aircraft at large commercial airports, the CTL maneuver is not usually an issue because air traffic controllers at those airports can usually direct commercial aircraft to a straight in landing. With smaller aircrafts at smaller airports, however, a CTL maneuver becomes a more usual occurrence. Even the large commercial airliners, on occasion, have to perform a CTL maneuver.

A straight in landing may not be available and a CTL maneuver may be required, for example, because of inclement weather or traffic around the airport. At some airports a CTL maneuver is necessitated by limited air traffic control facilities. In yet other instances an airport may have a straight in instrument approach procedure, but local weather conditions or other constraints favor another runway that does not have such an approach. Under these conditions the initial approach to the airport may be straight in, but the flight crew must then resort to a CTL maneuver. In other instances navigational aids ("NAVAIDS") direct the aircraft to the center of the airport rather than to the end of the runway. The flight crew must then perform the CTL maneuver to align with the appropriate runway. The pilot must use visual cues to maneuver the aircraft to downwind, base and final. This maneuvering is done manually or by using limited automation available today from a flight guidance computer ("FGC").

CTL maneuvers are performed at low altitude using visual cues such as runway lights. The CTL maneuver is very difficult in poor weather, at night time, or in other conditions of low visibility. During the CTL maneuver, the pilot is responsible for keeping the aircraft in protected air space. Landing an airplane, always a difficult task, becomes more difficult during a CTL maneuver because of the high work load experienced by the flight crew during the maneuver.

In view of the difficulty and hazard associated with a CTL maneuver, a need clearly exists for an automated procedure for controlling an aircraft in a CTL maneuver that would reduce the workload for the flight crew and increase safety.

BRIEF SUMMARY OF THE INVENTION

In accordance with one embodiment of the invention, a flight control system is provided to control a circle-to-land ("CTL") maneuver of an aircraft. The flight control system makes use an airborne area navigator (herein referred to as "area navigator") installed on the aircraft. The area navigator receives inputs on aircraft position and velocity, airport navigation data, and pilot supplied data. In response to those inputs, the area navigator provides steering and other control commands to an onboard flight director. The area navigator also provides such commands to the aircraft pilot. The pilot has the option of executing the CTL maneuver manually using the provided information or allowing the aircraft autopilot to execute the maneuver under the control of the flight director.

DETAILED DESCRIPTION OF PREFERRED EMBODIMENTS

Many airplanes, including all commercial airliners, most business jets, and many private aircraft, have an airborne area navigator (herein referred to as an "area navigator") onboard the aircraft that aids in the navigation of the aircraft between airports. For example, in flying from a distant airport to a destination airport, the area navigator, in combination with an autopilot system, can direct the flight of an aircraft from a time beginning shortly after takeoff and continuing until the aircraft approaches the destination airport. The area navigator is an onboard computer that accepts data inputs from the flight crew, sensors, navigational aids ("NAVAIDS") and air traffic controllers. Based on the data inputs, the area navigator calculates a route between airports and can either aid the pilot in flying from one airport to another, or can be coupled to the autopilot to control the flight. The area navigator has the ability to calculate and control lateral navigation. In addition, more advanced area navigators have the ability to calculate and control vertical navigation.

Figure 1:
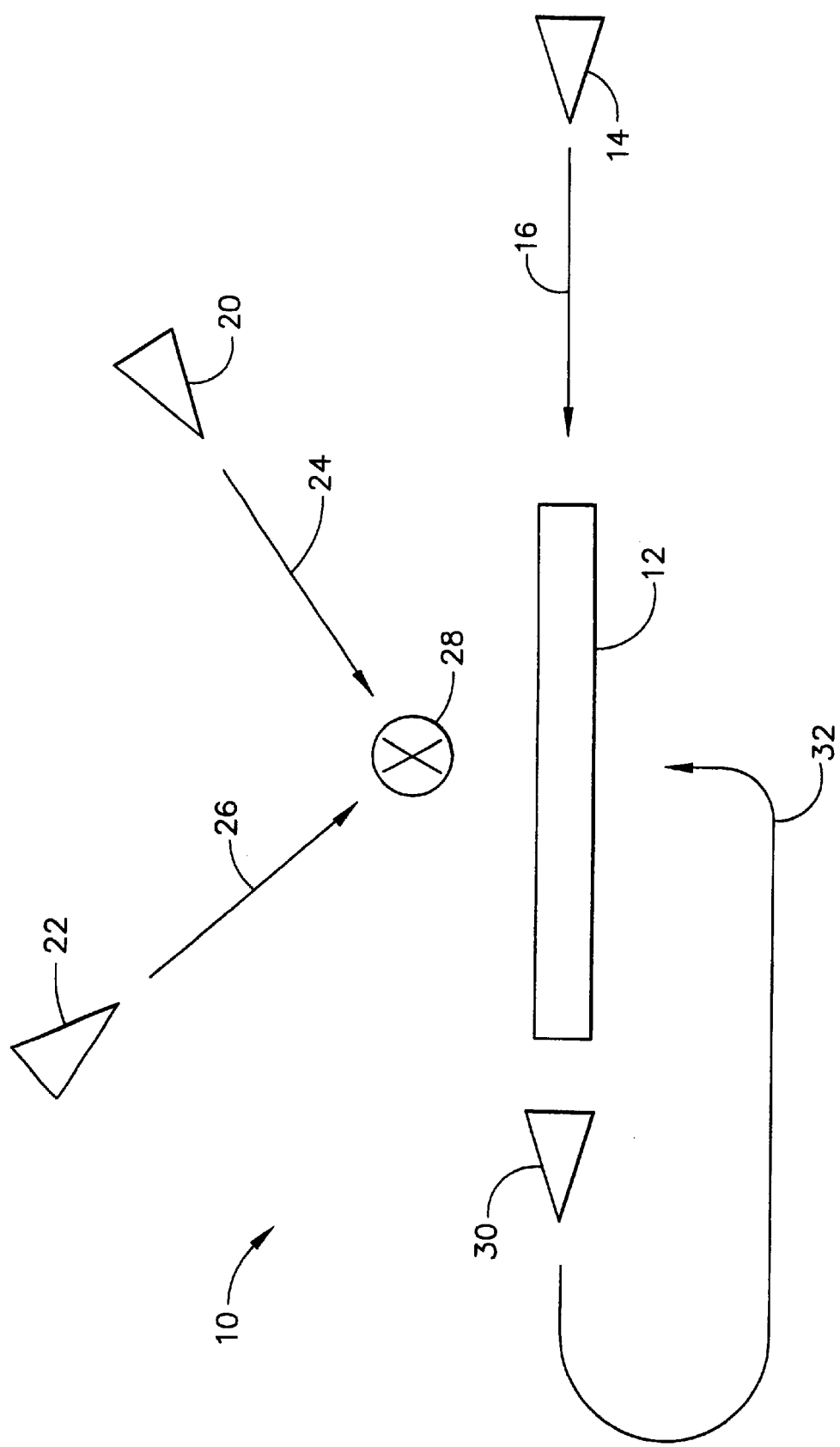
FIG. 1 schematically illustrates various landing situations giving rise to the need to execute a circle-to-land maneuver.

FIG. 1 illustrates various landing scenarios that may occur at an airport 10 having a runway 12. In a preferred situation, an aircraft 14 would be directed to a straight in landing approach along the path indicated by arrow 16. This is the situation that is encountered, in most instances, when a commercial airliner lands at a large commercial airport. Such a straight in landing is usually directed by the air traffic controller. Often, however, especially at smaller airports, an aircraft does not have the benefit of guidance by an air traffic controller or, for other reasons, is not able to make a straight in landing. For example, as illustrated, aircraft 20 and aircraft 22 are directed along flight paths indicated by arrows 24 and 26, respectively, toward the center of the airport 28. This may be the situation, for example, at smaller airports where a straight in approach for a preferred runway is not possible.

Figure 2:
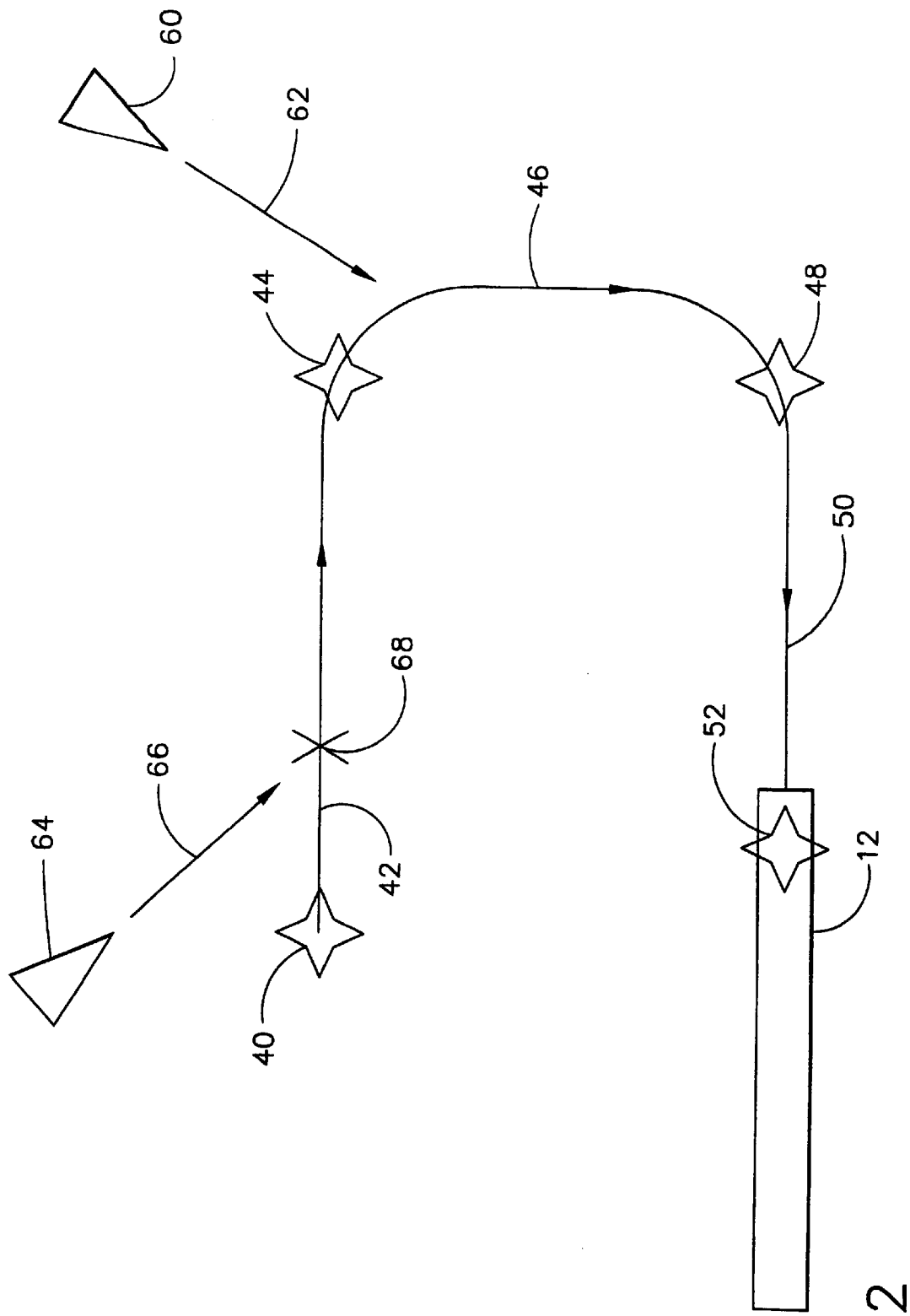
FIG. 2 schematically illustrates a circle-to-land maneuver.

In the majority of landing operations the flight crew is required to fly the aircraft visually and to land the aircraft visually on the designated runway. The flight crew is required to maintain the runway in sight during the landing operation. If the runway cannot be visually maintained, then a "missed approach" is performed. For each Standard Instrument Approach Procedure ("SIAP") there is a designated Missed Approach Point ("MAP") 28. Even in the case of aircraft 14 making a straight in landing, if the flight crew loses visual contact with the runway, a missed approach is performed and the aircraft is directed to the MAP. For example, if aircraft 30 has a missed approach, the standard procedure for starting the missed approach is to turn the aircraft toward the airport, start climbing, fly to the MAP and then perform the missed approach procedure. Such a flight pattern is indicated in FIG. 1 by the arrowed path 32. With each of aircraft 20, 22, and 30, the flight crew would be required to perform a CTL maneuver. FIG. 2 illustrates the elements of a conventional CTL maneuver, again landing on a runway 12. In the conventional CTL maneuver, the flight crew must manually and visually fly the aircraft to runway 12. The aircraft, starting from a first waypoint 40, flies a downwind leg 42 to a second waypoint 44 in the direction indicated by the arrows. Waypoint 40 is located along a line positioned substantially at the end of and perpendicular to runway 12. The flight crew then flies a base leg 46 to a third waypoint 48 and then a final leg 50 to a runway waypoint 52. Runway waypoint 52 is termed the "threshold" and waypoint 40 is termed to be "abeam" of the threshold. The pilot uses visual cues to aid him in the approach. The downwind, base, and final legs are executed manually by the pilot. Especially in adverse weather conditions, at night, or in other poor visibility conditions, it is difficult to maintain the proper visual contact. Especially on a right turn approach as illustrated, it is difficult for the pilot in command ("PIC") to maintain the proper visual contact because the PIC usually sits in the left seat of the cockpit. In addition to flying the aircraft and maintaining the proper visual contact, the flight crew must be ever vigilant for other aircraft that might be in the area and thus contributing to a potentially dangerous situation.

In accordance with one embodiment of the invention, the design, and optionally the execution, of the CTL maneuver is brought under the control of the onboard area navigator. Although the area navigator has the ability to control lateral navigation, and optionally to control vertical navigation, to date, the area navigator has not been programmed to design or fly CTL maneuvers. In accordance with the invention, the area navigator is programmed to design and optionally to fly a CTL maneuver. The area navigator can be so programmed using conventional software programming. Upon being so programmed, the area navigator can provide steering and other control instructions or commands during the CTL maneuver.

Again using the illustration in FIG. 2, in order to execute a CTL maneuver the flight crew would be responsible for getting the aircraft to waypoint 40 with or without the aid of the area navigator. From that location the area navigator could be used to design, and optionally to control, the CTL maneuver, both laterally and vertically. This would allow for a stabilized approach from waypoint 40 to waypoint 52 on runway 12.

The following illustrates one embodiment of the invention. The area navigator provides pages of menus (on a visual display screen) to aid the flight crew in flying the aircraft. On one page, the ARRIVAL page, the pilot selects the runway to be used for landing. For example, the pilot could choose runway 27 (i.e., a runway having a heading of 270 degrees) as the preferred runway and select a CTL maneuver to be performed to runway 27. In this example, runway 27 would correspond to the runway indicated by the numeral 12 in FIG. 2. For the approach, the pilot could select, for example, VORDME 09, a final approach leg having a heading of 90 degrees. "VORDME 09" indicates a navigational aid, Distance Measuring Equipment, corresponding to runway 09 (a runway having a heading of 90 degrees). The approach would be selected on the area navigator APPROACH page. The pilot could then select and indicate the intention to follow VORDME 09 APPROACH and that the CTL maneuver is being made to runway 27. The pilot or flight crew makes these selections from a menu provided by the area navigator. Continuing with the example, an APPROACH transition, STAR, and STAR transition could be selected at this point. The approach transitions are the preferred routes for the STAR to the initial approach fix that defines the start of the approach. "STAR" stands for Standard Terminal Arrival, and it defines the preferred route to be followed to the general vicinity of the airport. The STAR transitions are the preferred routes from the enroute airspace structure to the STAR.

The pilot, at this time, could also input the aircraft category and minimum decent altitude ("MDA") into the area navigator. Alternatively, to reduce flight crew workload at this critical time, the aircraft category and MDA could be preloaded into the area navigator. The aircraft category, which is indicative of the type of aircraft and is determined by the aircraft approach speed, in turn, determines the protected air space for this particular type of aircraft. For example, the maximum indicated air speed for a category D aircraft is 165 knots. For this category, the protected airspace is defined to extend 2.3 nautical miles from the end of the runway. Knowing the aircraft category and the MDA, the area navigator is able to compute the protected air space for the aircraft and to compute the placement or location of the top of descent ("TOD"). The TOD location is a dynamic factor that depends, for example, on the selected descent angle. The top of descent is the altitude at which the aircraft commences its constant descent to the runway. In accordance with one embodiment of the invention, a menu page can be provided by the area navigator to allow for sizing of the CTL maneuver. Options available to the flight crew in sizing the CTL maneuver would include a choice of right or left turn direction, turn radius, final approach segment length, and final approach glide path angle. These factors, in addition to the aircraft category and MDA, are supplied as inputs to and are used by the area navigator to calculate the appropriate CTL maneuver. Like the aircraft category and MDA, these factors can be preloaded into the area navigator to reduce flight crew workload during execution of the CTL maneuver.

One advantage of the CTL system and method, in accordance with the invention, is that pilots flying into unfamiliar airports for the first time have the option to select the automated CTL maneuver and enter the traffic pattern altitude ("TPA") as the MDA. The area navigator can then be used to fly the traffic pattern. The advantage of this is that the aircraft would approach the runway on a stabilized approach while performing a 180 degree turn. The pilot Would only need to monitor the system, allowing the flight crew the ability and luxury to look for other traffic in the traffic pattern. Another advantage of the CTL system and method, in accordance with the invention, is that the area navigator is able to calculate and control the CTL maneuver to eliminate over shoots during the turn onto final. The area navigator is able to calculate a pre-defined ground track using its knowledge of aircraft conditions, together with winds or other atmosphere conditions, to anticipate the roll out onto final. This eliminates the possibility of the aircraft "flying through final" and getting too close to another aircraft making an approach on a parallel runway.

In accordance with another embodiment of the invention, the flight crew has the ability to modify the CTL maneuver in order to fly part or all of the CTL maneuver. The area navigator defines a ground track for the CTL maneuver. The flight crew can elect to fly directly to one of the waypoints associated with the CTL maneuver. The area navigator provides guidance to direct the aircraft to the chosen waypoint and then provides further guidance to direct the aircraft through the remainder of the CTL maneuver. For example, the flight crew may be instructed to enter the traffic pattern on a base leg and not to fly a 180 degree turn. The flight crew could use the area navigator to modify the CTL maneuver to not fly abeam of the threshold, but instead to fly directly onto a base leg with a 90 degree turn onto final. This is illustrated, for example, by the aircraft 60 entering the traffic pattern along a path 62 as illustrated in FIG. 2. In accordance with one embodiment of the invention, the CTL maneuver can be modified to allow the aircraft to intercept any portion of the calculated CTL maneuver path. Upon intercept, the area navigator provides guidance to turn the aircraft onto the correct path associated with the CTL maneuver. The area navigator would then provide guidance to the aircraft to complete the remainder of the CTL maneuver. This is illustrated, for example, by the aircraft 64 entering the traffic pattern along a path 66 and intercepting the CTL maneuver path at a point 68 as illustrated in FIG. 2.

In accordance with a further embodiment of the invention, the CTL maneuver can be modified to fly specific distances on final. Often a flight crew is instructed to fly a final leg of fixed length, such as a 5 nautical mile final leg. This information is entered as an input to the area navigator which then modifies the CTL to direct the aircraft to turn onto a 5 nautical mile final approach to the runway.

In those aircraft having an area navigator that is capable of controlling vertical navigation, such vertical navigation is often controlled by what is termed a "VNAV" subsystem in the area navigator. In accordance with one embodiment of the VNAV subsystem, the pilot sets an altitude preselector to "inform" the area navigator of the altitude to which it is desired to climb or descend. As the aircraft descends, for example, the pilot continues to dial the preselector to lower altitudes. When flying an approach, the flight crew usually configures the aircraft for a missed approach prior to commencing the approach. This is done as a precautionary measure to reduce the workload on the flight crew if an actual miss should occur. One item in configuring the aircraft for a missed approach is to set the altitude preselector to the missed approach altitude. If a missed approach then becomes necessary, the flight crew can begin the missed approach climb, then engage VNAV, and the area navigator will control the climb to the preselected missed approach altitude.

In accordance with one embodiment of the invention, VNAV is placed in a mode (the Vertical Glidepath mode or "VGP") in which the VNAV ignores the preselector to cause the aircraft to descend lower than the preselector. VGP is only active during approaches. This allows the crew to dial the preselector to the missed approach altitude while the aircraft is descending without VNAV causing the aircraft to climb. During the descent phase of the CTL maneuver, in accordance with this embodiment of the invention, under the guidance of VNAV, the aircraft will level at the MDA while the preselector is set to the missed approach altitude. The aircraft will then fly at the MDA until the next TOD is encountered. The TOD will be encountered, in a CTL maneuver, at a location after waypoint 40 but prior to waypoint 52. At the TOD, the aircraft will begin to descend to waypoint 52 at the end of runway 12. All this will occur with the altitude preselector set for the missed approach altitude. If the pilot needs to execute a missed approach during the CTL, the preselector will already be preset and the aircraft will start climbing and will level off at the preselected altitude. This reduces crew workload during the missed approach and improves safety.

Figure 3:
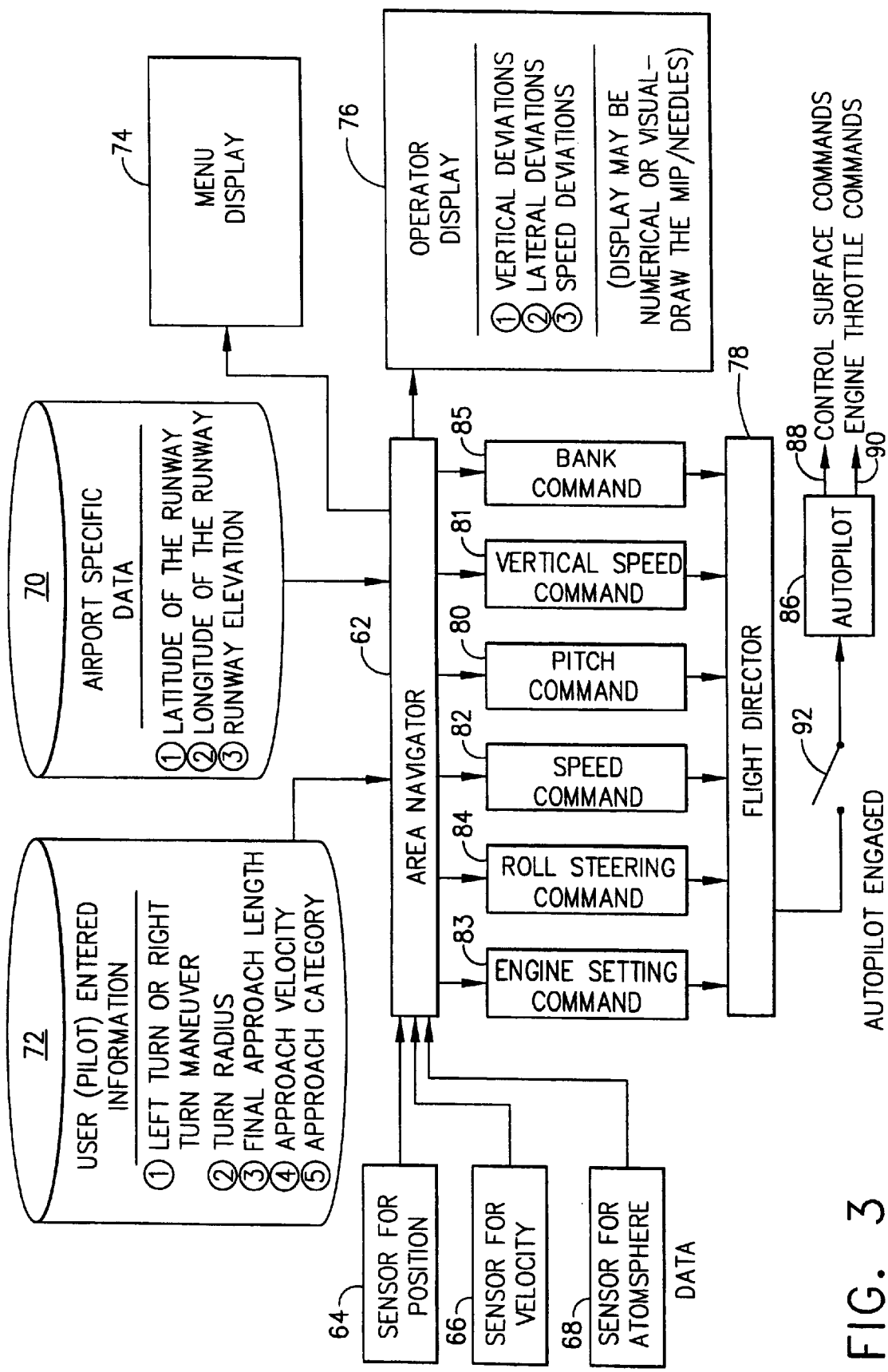
FIG. 3 illustrates, in block diagram form, a circle-to-land system.

FIG. 3 illustrates schematically a CTL system in accordance with one embodiment of the invention. Central to the CTL system is an area navigator 62. The area navigator is adapted to receive inputs from several sources and, based on data from those sources, determining an appropriate CTL maneuver. Representative possible inputs are illustrated. For example, sensor 64 provides position data, sensor 66 provides aircraft velocity data, and sensors 68 provide data on atmospheric conditions. Another input of the area navigator receives airport specific data 70 such as latitude and longitude of the runway and runway elevation. The area navigator is also configured to receive pilot entered information 72 such as a choice of left turn or right turn maneuver, turn radius, final approach length, approach velocity, and airplane category. Such pilot entered data can be entered on a real time basis or can be pre-entered.

The area navigator also controls displays that provide information to the flight crew. For example, a menu display 74 provides the ARRIVAL and APPROACH pages from which the pilot makes selections of desired runway, standard terminal arrival ("STAR"), and the like. The area navigator also controls a display 76 that provides the flight crew with data on how to execute the CTL procedure such as appropriate headings, speed, and descent angle, and deviations in vertical and lateral position and deviation in approach speed. Display 76 can be, for example, in the form of a readout on a screen or in the form of an indicator on one or more dials or other types of cockpit displays.

The area navigator makes the necessary calculations for defining the appropriate CTL maneuver and for controlling the aircraft during the CTL maneuver. Commands for controlling the aircraft in response to the calculations are conveyed to a flight director 78 if the aircraft is so equipped. These commands may include, for example, any of the following: a pitch command 80, vertical speed command 81, aircraft speed command 82, engine setting command 83, roll steering command 84, bank command 85, and the like. Those familiar with designing an area navigator will appreciate the variety of possible commands that may be exchanged between the area navigator and the flight director and other subsystems of the aircraft. The aircraft may also include an autopilot 86 which, in accordance with one embodiment of the invention provides control surface commands 88 and engine throttle commands 90 to maintain the aircraft on the prescribed flight plan. An autopilot engage switch 92, under the control of the flight crew, determines whether the aircraft is flown by the autopilot 86 or under the manual control of the flight crew. If flown manually, the flight crew may receive input via display 76 or via flight director 78.

Thus it is apparent that there has been provided, in accordance with the invention, a flight control system and method for controlling a circle-to-land maneuver that fully meets the needs set forth above. Although the invention has been described and illustrated with reference to specific embodiments thereof, it is not intended that the invention be limited to those illustrative embodiments. Those of skill in the art will recognize that variations and modifications can be made in those embodiments without departing from the scope of the invention. For example, the inputs to the area navigator may be varied depending, for example on the particular aircraft upon which the CTL system is installed. Similarly, the commands provided by the area navigator to control the CTL maneuver may be varied from aircraft to aircraft. Accordingly, it is intended to encompass within the invention all such variations and modifications as fall within the scope of the appended claims.

In the claims:

1. A method for landing an aircraft on a designated runway at a predetermined airport including executing a circle-to-land maneuver comprising the steps of:

selecting a standard terminal arrival path;

directing the aircraft to a starting point of a standard terminal arrival path;

following the standard terminal arrival path to a first waypoint for initiation of the circle-to-land maneuver; and allowing an airborne area navigator system to calculate and to control the circle-to-land maneuver including a downwind leg to a second waypoint and a base leg to a third waypoint to align the aircraft with a final leg directed to the designated runway.

2. The method of claim 1 wherein the step of following the standard terminal arrival path to a first waypoint comprises directing the aircraft to a location along a line positioned substantially at the end of and perpendicular to the end of the runway.

3. The method of claim 1 wherein the step of allowing comprises determining an appropriate ground track including a 180 degree turn from the downwind leg to the final leg.

4. The method of claim 1 wherein the step of allowing comprises calculating and controlling both the lateral and vertical path of the aircraft.

5. The method of claim 1 further comprising the step of entering pilot-selected data into the airborne area navigator.

6. The method of claim 5 wherein the step of entering comprises entering information concerning aircraft category and minimum descent altitude.

7. The method of claim 6 wherein the step of allowing comprises calculating and controlling to maintain the aircraft within protected airspace.

8. The method of claim 5 wherein the step of entering comprises entering data selected from preference for a right turn or a left turn direction, turn radius, final approach segment length, and final approach glidepath.

9. The method of claim 8 wherein the step of allowing comprises calculating and controlling a circle-to-land maneuver along a predetermined ground track determined in part by data entered.

10. A flight control system for automatically controlling a circle-to-land maneuver of an aircraft comprising:
an onboard area navigator;
sensors coupled to first inputs of the area navigator for inputting aircraft position and velocity data;
second inputs to the area navigator for receiving pilot-supplied data;
third inputs to the area navigator for receiving airport-specific data;
a flight director coupled to a first output of the area navigator to receive commands from the area navigator, the commands responsive to data received at the first, second, and third inputs;
an autopilot capable of controlling the flight of the aircraft;
a pilot-operable switch coupled between the flight director and the autopilot for selectively engaging the autopilot; and
an operator cockpit display coupled to a second output of the area navigator for providing flight information to a pilot, the information responsive to data received at the first, second, and third inputs.

11. The flight control system of claim 10 wherein the commands are selected from a list consisting of: a pitch command, a speed command, and a roll steering command.

12. The flight control system of claim 10 wherein the flight information comprises deviations in aircraft vertical position, lateral position, and speed.

13. The flight control system of claim 10 wherein the pilot-supplied data comprises aircraft category.

14. The flight control system of claim 10 wherein the pilot-supplied data comprises desired turn radius, final approach length, and approach velocity for the circle-to-land maneuver.

15. The flight control system of claim 10 wherein the airport specific data comprises latitude, longitude, and elevation of the runway upon which the aircraft is to be landed.

16. An onboard flight control system for automatically controlling a circle-to-land maneuver of an aircraft comprising:
an onboard area navigator programmed to determine an appropriate circle-to-land maneuver in response to data supplied to the onboard area navigator;
inputs coupled to the onboard area navigator to convey the data to the onboard area navigator; and
a visual display coupled to an output of the onboard area navigator to display operating information to a flight crew aboard the aircraft, the operating information responsive to data received by the inputs.

17. The onboard flight control system of claim 16 wherein the onboard area navigator is programmed to include a vertical navigation subsystem.

18. The onboard flight control system of claim 17 wherein the vertical navigation subsystem of the onboard area navigator is adapted to receive data from an altitude preselector.

19. The onboard flight control system of claim 18 wherein the vertical navigation subsystem of the onboard area navigator is programmed to ignore the data from the altitude preselector during a circle-to-land maneuver.

20. The onboard flight control system of claim 16 further comprising a flight director coupled to an output of the onboard area navigator to convey operating information to a flight crew aboard the aircraft, the operating information responsive to data received by the inputs.

21. A method for executing a circle-to-land maneuver for an aircraft by utilizing area navigator and autopilot systems onboard an aircraft, the method comprising the steps of:
determining a runway selected for landing;
selecting an approach path for initiating the circle-to-land maneuver;
entering data concerning desired flight conditions into the area navigator to allow the area navigator to calculate lateral and vertical navigation required for the circle-to-land maneuver;
directing the aircraft to the waypoint at which the circle-to-land maneuver is to begin; and
allowing the autopilot, directed by the area navigator, to execute the maneuver from the waypoint to the selected runway.

22. The method of claim 21 wherein the step of entering data comprises entering minimum descent altitude, desired turn direction, turn radius, final approach segment length, and final approach glidepath angle.

23. The method of claim 22 wherein the step of entering data further comprises entering the aircraft category to allow the area navigator to calculate the appropriate circling maneuver to keep the aircraft within protected airspace.

24. A method for landing an aircraft on a designated runway at a predetermined airport including executing a circle-to-land maneuver, the method comprising the steps of:
providing an airborne area navigator system programmed to designate the ground track for the circle-to-land maneuver onto the designated runway at the predetermined airport;
designating a ground track for the circle-to-land maneuver;
providing instructions to the aircraft from the airborne area navigator system directing the aircraft to intercept the circle-to-land maneuver at an intercept predetermined by a flight crew aboard the aircraft;

upon intercept of the circle-to-land maneuver, allowing the airborne area navigator system to direct the aircraft to follow the ground track for the circle-to-land maneuver.

25. The method of claim 24 further comprising the step of providing from the airborne area navigator, instructions to the flight crew to navigate to the predetermined intercept.

26. The method of claim 24 wherein the step of providing instructions to the aircraft from the airborne area navigator system directing the aircraft to intercept the circle-to-land maneuver comprises providing instructions directing the aircraft to fly a base leg and a final leg.

* * * * *